United States Patent Office 3,538,397
Patented Nov. 3, 1970

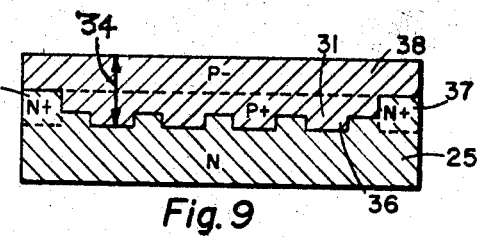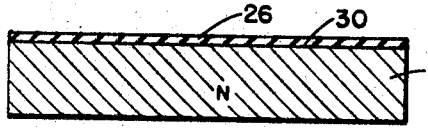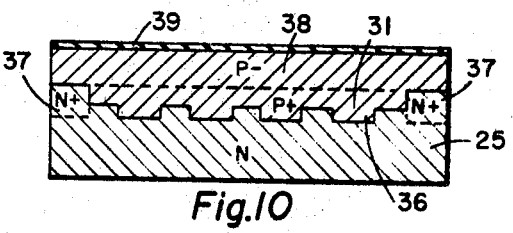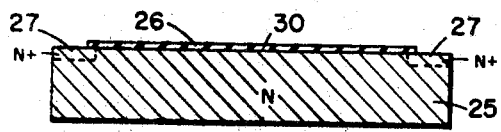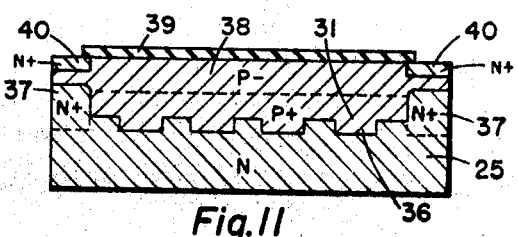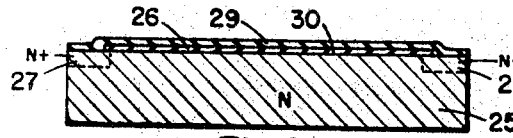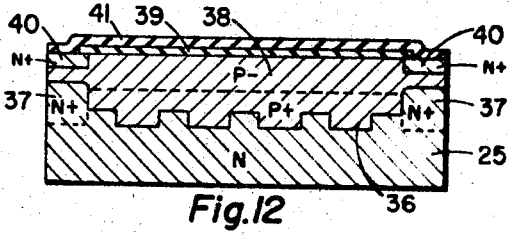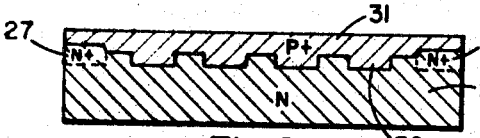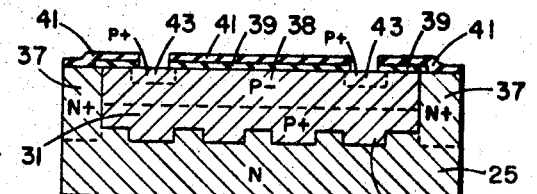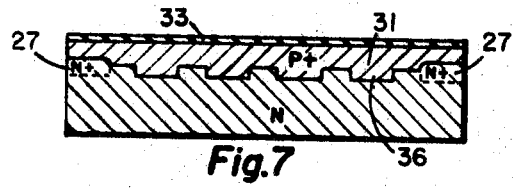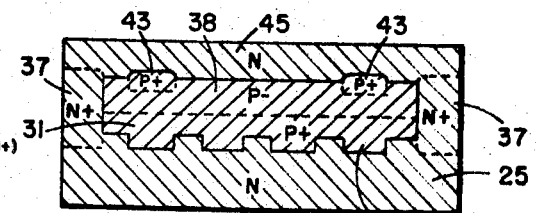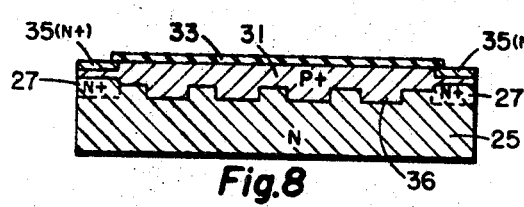

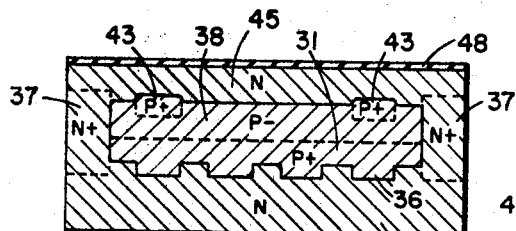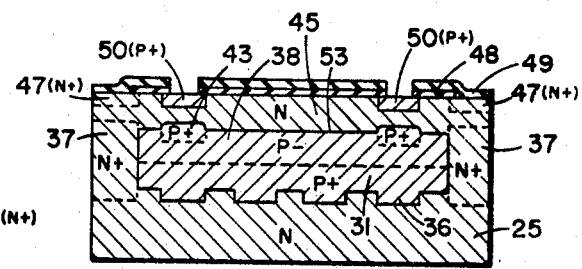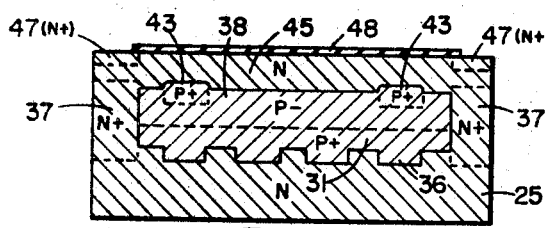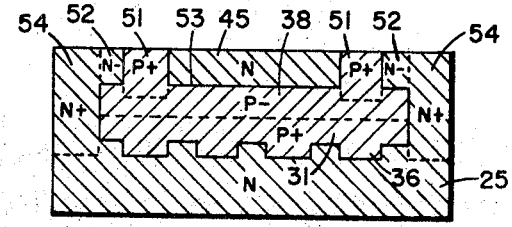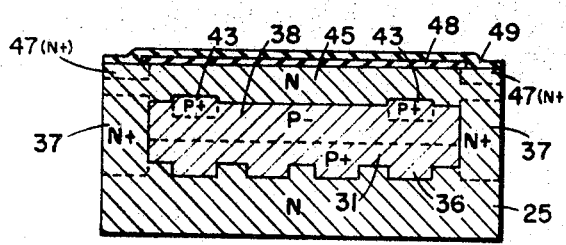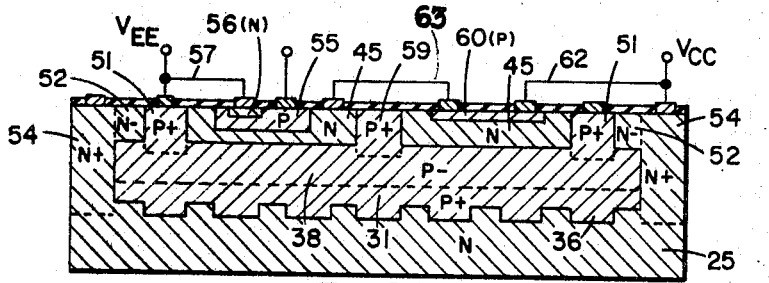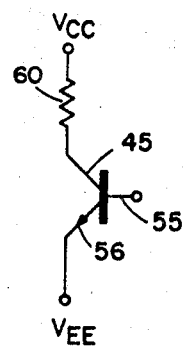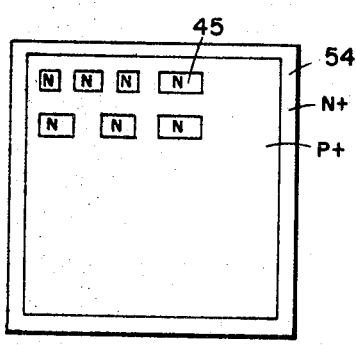

3,538,397
DISTRIBUTED SEMICONDUCTOR POWER SUPPLIES AND DECOUPLING CAPACITOR THEREFOR
Stanley P. Davis, Cupertino, Calif., assignor to Motorola, Inc., Franklin Park, Ill., a corporation of Illinois
Filed May 9, 1967, Ser. No. 637,144
Int. Cl. H01l 19/00
U.S. Cl. 317—235                                      6 Claims

ABSTRACT OF THE DISCLOSURE

A monolithic semiconductor structure and method of making same and in which structure supply voltages are distributed through adjacent P and N type layers to surface regions of the structure. These voltages are available for integrated circuits and other devices which are constructed in the surface regions of the structure. Good capacitive decoupling is provided between the P and N layers used to distribute voltages and a relatively high capacitive reactance at the surface region prevents AC short circuits at high frequencies.

---

This invention relates generally to voltage distribution systems for integrated circuits and more particularly to a voltage distribution system constructed as a monolithic semiconductor structure. This invention also relates to a method for making the structure.

The present invention is embodied in a structure which includes semiconductor layers which are used for distributing voltages and other layers in which transistors and other semiconductor devices are constructed to form integrated circuits. The words "system" and "integrated circuit" may be used interchangeably herein since the monolithic semiconductor structure to be described is both a voltage distribution system and an integrated circuit.

BACKGROUND OF THE INVENTION

When many semiconductor devices are constructed in a monolithic semiconductor having layers which are used for distributing supply voltages and other layers in which the semiconductor devices are built, it becomes necessary to provide compatible electrical coupling between the various layers of the structure. For example, the layers of the structure which are used to distribute supply voltages should have a relatively high capacitance therebetween to produce good decoupling, and other layers of the structure should have negligible capacitive coupling therebetween to prevent AC short circuits at high frequencies. The structure according to this invention is constructed to have both of these features and requires no capacitors which are external to the structure itself.

SUMMARY OF THE INVENTION

An object of this invention is to provide an improved monolithic semiconductor structure for distributing supply voltages.

Another object of this invention is to provide an improved voltage distribution system for integrated circuits wherein the system and circuits are combined in a single structure.

Another object of this invention is to provide good capacitive decoupling between certain regions of the monolithic semiconductor structure and a high capacitive reactance between other regions of the structure.

Another object of this invention is to provide a novel method for making the structure.

This invention features a high capacitance PN junction between the P type and N type regions within the semiconductor structure which are used for distributive voltages. This high capacitance PN junction provides good capacitive decoupling between these regions and prevents adverse electrical interference between same.

Another feature of this invention is the provision of a low capacitance PN junction between adjacent semiconductor layers within the structure in which transistors and other semiconductor devices are constructed.

Briefly described, the present invention is embodied in a semiconductor structure and proess for fabricating same wherein initially a relatively low resistivity first region of one conductivity type semiconductor material is formed in a semiconductor substrate. Thereafter, a second region of opposite conductivity type semiconductor material is formed on the surface of the substrate and on the surface of the first region. Next, a third region of the one conductivity type semiconductor material, also of relatively low resistivity, is diffiused through the second region and into the first region to form a first continuous band of one conductivity type semiconductor material which extends normal to the substrate. Subsequent diffusions of the opposite conductivity type semiconductor material into the surface of the structure and into the second region produce a second band of opposite conductivity type semiconductor material. These first and second bands are used to distribute voltages from within the semiconductor structure to the surface thereof making available at the surface of the structure bias voltages which may be applied to transistors and other semiconductor devices constructed in the surface regions of the structure. The second region of opposite conductivity type semiconductor material is a graded region, having a first portion of relatively low resistivity semiconductor material adjacent to substrate to provide good capacitive decoupling thereat and having a second portion of relatively high resistivity semiconductor material. This second portion prevents AC shorting between the surface regions of the structure in which semiconductor devices and integrated circuits are built.

BRIEF DESCRIPTION OF THE DRAWINGS

In the accompanying drawings:
FIGS. 1 to 3 illustrate the formation of a first region of N+ semiconductor material;
FIGS. 4 and 5 illustrate the formation of a plurality of spaced regions which form concentric rings and are also referred to as "plugs";
FIG. 6 illuustrates the formation of an epitaxial first portion (P+) of the graded, opposite conductivity P type second region (see FIG. 9);
FIGS. 7 and 8 illustrate the formation of a third region of N+ conductivity which diffuses into the first region to form a closed N+ outer band;
FIG. 9 illustrates the formation of a second portion (P—) of the second region of the semiconductor structure;
FIGS. 10 and 11 illustrate the formation of a fourth region which diffuses into the closed outer band;
FIGS. 12 and 13 illustrate the formation of a fifth region of opposite conductivity (P+) semiconductor material;
FIG. 14 illustrates the formation of a sixth region of N— epitaxially grown, semiconductor material;
FIGS. 15 and 16 illustrate the formation of a seventh region of N+ semiconductor material which also diffuses into the closed outer band;
FIGS. 17 and 18 illustrate the formation of an eighth region of P+ semiconductor material which diffuses into the P+ fifth region to form a continuous P+ inner band as shown in FIG. 19;
FIG. 19 further shows the completed integrated structure prior to the construction of any integrated circuits or devices therein;

FIGS. 20 and 21 show a simple transistor-resistor integrated circuit which has been constructed in the regions adjacent to surface of the structure shown in FIG. 20; and FIG. 22 illustrates the formation of a plurality of isolated surface regions in which transistors, resistors and other devices may be formed.

DETAILED DESCRIPTION OF THE PREFERRED EMBODIMENTS

Referring in detail to the accompanying drawings, there is shown in FIG. 1 an N type semiconductor substrate 25 which is the starting material for the process to be described below. For ease of illustration, the description of this process will refer to the construction of a single structure (FIG. 20), but it will be understood by those skilled in the art that many of these structures can be built simultaneously using the process according to this invention. FIG. 2 shows a protective oxide coating 26 which has been formed on the surface 30 of the substrate 25, and in FIG. 3 the oxide has been cut in order to diffuse a first region 27 of one conductivity type, i.e., N+, into the surface of the N type substrate 25.

After the formation of region 27, another layer of oxide 29 is grown over the original oxide coating 26 and over the surface areas of region 27 as shown in FIG. 4. Subsequently, the oxide coating is again cut (FIG. 5) to permit the formation, i.e., diffusion, of a plurality of spaced regions 28 and 36 in the substrate 25.

After the spaced closed regions 28 and 36 have been formed as shown, a P+ layer of silicon is epitaxially grown as illustrated in FIG. 6 to form a relatively low resistivity first portion 31 of the graded, P type buried region 34 (FIG. 9).

A layer of silicon dioxide 33 is then formed over the P+ layer as shown in FIG. 7 and is subsequently cut as shown in FIG. 8 to permit the diffusion of a third region 35 of N+ conductivity.

The region 35 is diffused inwardly and meets region 27 which diffuses outwardly to form a continuous N+ band 37 as shown in FIG. 9. Next, the oxide coating 33 is removed from the structure shown in FIG. 8 and a second portion 38 of relatively high resistivity (P—) semiconductor material is epitaxially grown on the first portion 31 to complete the second region 34 of graded P type (opposite) conductivity.

After the formation of the P— portion 38, an oxide coating 39 is grown or deposited on the surface of the structure as shown in FIG. 10. Subsequently the oxide is cut at the exterior edges thereof to permit the diffusion of a fourth region 40 of N+ conductivity into the P— second portion 38. The N+ region 40 diffuses inwardly, and by the process of in-diffusion and out-diffusion the region 40 is integrally formed with and becomes a part of the continuous outer band 37 of the one conductivity type semiconductor material. In FIG. 12 an oxide coating 41 is again formed over the remaining unetched oxide on the surface of the structure and over the N+ region 40, and in FIG. 13 openings are cut in this oxide coating using known photolithographic techniques. The latter step permits the diffusion of a fifth region 43 of opposite conductivity type (P+) semiconductor material into the P— layer 38.

The next step in the process is to remove the oxide coating 41 that is shown in FIG. 13 and thereafter epitaxially grow a sixth region 45 of N type conductivity (N—) as shown in FIG. 14. An oxide coating 48 is then formed over region 45 and openings are cut in this coating to permit the subsequent diffusion of a seventh region 47 of N+ conductivity into region 45. The N+ region 47 eventually diffuses into the N+ outer band 37 to increase the vertical extent thereof as shown in FIG. 19.

Another oxide coating 49 is then deposited or grown on the oxide coating 48 as shown in FIG. 17, and an eighth region 50 of opposite conductivity type (P+) semiconductor material is diffused through the openings which are cut in this oxide coating (FIG. 18). The in-diffusion and out-diffusion by the regions 50 and 43 and by the regions 47 and 37 respectively results in the P+ and N+ vertical inner and outer bands 51 and 54 as shown in FIG. 19. These concentric annular bands 51 and 54 of P+ and N+ conductivity types extend from within the semiconductor structure to the surface thereof. Conveniently, the P+ and N+ channels 51 and 54 in FIG. 19 are separated by a section 52 of the N— type semiconductor layer 45. This construction prevents the formation of poor P+N+ junction between bands 51 and 54.

The semiconductor structure according to this invention can be formed with as many isolated sections of the N— surface layer 45 as are necessary for a given integrated circuit application. For example, consider a simple transistor circuit consisting of a transistor and a resistor connected between a source of emitter potential $V_{EE}$ and a source of collector potential $V_{CC}$ (FIG. 21). By adding an additional isolation diffusion to the above described process to form a P+ region 51, the upper N— layer 45 is separated into left and right hand sections which are isolated as shown in FIG. 20. A NPN transistor is then formed in the left hand section and includes base and emitter regions 55 and 56 overlaying the N— type collector which is a portion of the layer 45. These regions can be formed, for example, using known double-diffusion techniques. In the right hand section of layer 45 a P type resistor 60 is diffused into the surface of the structure. This resistor is connected via line 62 to collector potential $V_{CC}$ and via line 63 to the collector of the NPN transistor as shown in FIG. 20. Note that the collector potential $V_{CC}$ is brought to the surface of the structure through the outer N+ band 54. The emitter 56 of the NPN transistor is connected via conductor 57 to the emitter potential $V_{EE}$ which is brought to the surface of the structure through the P+ inner band 51. The schematic diagram of the integrated structure in FIG. 20 is shown in FIG. 21.

FIG. 22 illustrates the formation of many isolated sections of the upper N— layer 45. Each of these N— sections may be connected to the N+ and P+ bands 54 and 51 respectively at the surface of the structure, and this system for distributing voltages greatly minimizes the amount of metalization required to electrically connect integrated circuits which are constructed in semiconductor layer 45.

The resistivity ranges for the various semiconductor layers in the table below are listed by way of illustration only and should not be construed as limiting the scope of this invention.

TABLE

| Region: | Resistivity in ohm-centimeters |
| --- | --- |
| N type substrate 25 | 0.005–.05 |
| P+ region 31 | .01–0.5 |
| P— region 38 | 1.0–5.0 |
| N+ band 54 | 0.01–0.1 |
| P+ band 51 and region 59 | 0.1–0.5 |
| N— epi layer 45 | 1.0–10.0 |

I claim:

1. A monolithic integrated structure for distributing voltages including, in combination:
   (a) a substrate region,
   (b) a first region of one conductivity type semiconductor material and of low resistivity formed within said substrate region which is the same conductivity type semiconductor material as said first region,
   (c) a second region of graded, opposite conductivity type semiconductor material formed integral with said substrate region and with said first region, said second region having a first portion thereof of relatively low resistivity semiconductor material and forming a high capacitance PN junction with said substrate region and with said first region, said second region further including a second portion of relatively high resistivity semiconductor material, (d) a third region of said one conductivity type semiconductor material formed through said second region and integral with said first region, and (e) a surface region adjacent said second portion of said second region and forming therewith a relatively low capacitance PN junction, said surface region adapted for housing semiconductor devices and integrated circuits and being operatively biased from voltages supplied through said first, second and third regions of said structure.

2. The structure according to claim 1 which further includes (a) a fourth region of said one conductivity type semiconductor material integral with said third region and forming an outer band of low resistivity semiconductor material for distributing voltages, and (b) a fifth region of said opposite conductivity type semiconductor material within said second portion of said second region and forming an inner band of said opposite conductivity type semiconductor material, said outer and inner bands providing separate voltage distribution paths from said substrate and from said second region, respectively, to said surface region of said structure, said surface region of said structure constituting a sixth region of said one conductivity type semiconductor material which is integral with said second portion of said second region, said sixth region adapted to have active and passive components formed therein in a monolithic integrated circuit.

3. The structure according to claim 2 which further includes (a) a seventh region of said one conductivity type semiconductor material integral with said fourth region and extending said outer band to the surface of said structure, and (b) an eighth region of said opposite conductivity type semiconductor material integral with said fifth region and extending said inner band to said surface of said structure, said inner and outer bands separated by a section of said sixth region through which said bands are formed, said second portion of said second region and said sixth region forming a low capacitance PN junction which impedes extraneous AC coupling between separate devices formed within said sixth region.

4. The structure according to claim 3 further having a transistor formed within said sixth region, said transistor having an emitter, a base and a collector, said emitter biased via a supply voltage conducted through said inner band and said collector biased via a supply voltage conducted through said outer band.

5. The structure according to claim 4 wherein the resistivity of the first, third, fourth and seventh regions which forms said outer band ranges from 0.01 to 0.1 ohm-centimeters, the resistivity of said first portion of said second region ranges from .01 to 0.5 ohm-centimeter, the resistivity of said fifth and eighth regions which form said inner band ranges from 0.1 to 0.5 ohm-centimeter and the resistivity of said sixth region ranges from 1.0 to 10.0 ohm-centimeters.

6. A semiconductor structure in a unitary semiconductor body having first and second opposed major surfaces, the improvement including in combination, a first region of a first conductivity type semiconductive material contiguous with the second major surface, a second region of second conductivity type semiconductive material adjacent said first region, a surface region for housing integrated circuits and semiconductor devices intermediate said second region and said first major surface of said semiconductor body, said surface region having a plurality of spaced apart and electrically isolated semiconductor sections extending into the body from the first major surface, said second region having a substantially greater resistivity adjacent said electrically isolated sections than adjacent said first region, a rectifying junction intermediate said first and second regions and exhibiting a distributed capacitance, first and second bands, one contiguous with the other, and comprising respectively first and second conductivity type, low resistivity semiconductive materials extending between the first major surface and said first and second regions, respectively, said first and second bands having a cross sectional area substantially less than said first and second regions as measured parallel to said major surfaces of said semiconductor body, and power supply means connected to one each of said first and second bands at one location for distributing power through said first and second regions to locations in said surface region remote from said one location.

References Cited

UNITED STATES PATENTS

| 3,309,537 | 3/1967 | Archer | 317—235 |
| 3,341,755 | 9/1967 | Husher et al. | 317—235 |
| 3,379,584 | 4/1968 | Bean et al. | 317—235 |
| 3,430,110 | 2/1969 | Goshgarian | 317—235 |

JERRY D. CRAIG, Primary Examiner

U.S. Cl. X.R.

307—304; 148—175